US010214166B2

(12) United States Patent
Dlagnekov (10) Patent No.: US 10,214,166 B2
(45) Date of Patent: Feb. 26, 2019

(54) SYSTEMS AND METHODS FOR IMPACT DETECTION WITH NOISE ATTENUATION OF A SENSOR SIGNAL

(71) Applicant: CalAmp Corp., Irvine, CA (US)

(72) Inventor: Alexandre Dlagnekov, Escondido, CA (US)

(73) Assignee: CalAmp Corp., Irvine, CA (US)

(*) Notice: Subject to any disclaimer, the term of this patent is extended or adjusted under 35 U.S.C. 154(b) by 201 days.

(21) Appl. No.: 14/737,197

(22) Filed: Jun. 11, 2015

(65) Prior Publication Data

US 2016/0362075 A1  Dec. 15, 2016

(51) Int. Cl.
| | | |
|---|---|---|
| *G01P 15/00* | (2006.01) | |
| *G07C 5/00* | (2006.01) | |
| *B60R 16/023* | (2006.01) | |
| *B60R 21/0132* | (2006.01) | |
| *G01P 15/08* | (2006.01) | |

(52) U.S. Cl.
CPC ...... *B60R 16/0232* (2013.01); *B60R 21/0132* (2013.01); *G01P 15/00* (2013.01); *G01P 15/0891* (2013.01); *G07C 5/008* (2013.01)

(58) Field of Classification Search
CPC ............ B60R 16/0232; B60R 21/0132; B60R 2021/01302; B60R 2021/01322; B60R 2021/01345; B60R 21/0133; B60R 21/01336; B60R 21/0136; G01P 15/00; G01P 15/0891; G07C 5/008

USPC ...... 702/54, 56, 92, 141, 190, 191; 280/734, 280/735; 701/32.2, 45, 46; 340/435, 340/436, 438, 539.1; 73/1.37, 1.39; 307/10.1; 708/490

See application file for complete search history.

(56) References Cited

U.S. PATENT DOCUMENTS

| | | | |
|---|---|---|---|
| 4,549,277 A | 10/1985 | Brunson et al. | |
| 5,117,375 A | 5/1992 | Worcester et al. | |
| (Continued) | | | |

FOREIGN PATENT DOCUMENTS

| | | |
|---|---|---|
| GB | 2506365 A | 4/2014 |
| WO | 2000017607 | 3/2000 |
| (Continued) | | |

OTHER PUBLICATIONS

International Preliminary Report on Patentability for International Application PCT/US2013/054939, Issued Aug. 25, 2015, dated Sep. 3, 2015, 4 Pgs.

(Continued)

*Primary Examiner* — John H Le
(74) *Attorney, Agent, or Firm* — KPPB LLP (57) ABSTRACT

Systems and methods for impact detection in accordance with embodiments of the invention are disclosed. In one embodiment, a vehicle impact detection system includes an acceleration sensor, a storage device storing an impact detection application, and a processor, where the impact detection application directs the processor to receive acceleration information using the acceleration sensor, filter the acceleration information to attenuate noise, determine an occurrence of an impact by detecting an acceleration from the acceleration information that exceeds a threshold for a time period, detect an angle of the impact with respect to a forward direction using the acceleration information, and trigger an impact detector signal.

18 Claims, 7 Drawing Sheets

(56) References Cited

U.S. PATENT DOCUMENTS

| | | | |
|---|---|---|---|
| 5,251,161 A | 10/1993 | Gioutsos et al. | |
| 5,339,242 A | 8/1994 | Jensen et al. | |
| 5,559,699 A | 9/1996 | Gioutsos et al. | |
| 5,563,791 A | 10/1996 | Gioutsos et al. | |
| 5,587,906 A | 12/1996 | Muckley et al. | |
| 5,684,701 A | 11/1997 | Breed et al. | |
| 5,758,301 A | 5/1998 | Saito et al. | |
| 5,767,766 A * | 6/1998 | Kwun | B60R 21/0136 180/282 |
| 5,780,782 A | 7/1998 | O'Dea et al. | |
| 5,825,283 A | 10/1998 | Camhi | |
| 5,841,201 A | 11/1998 | Ibaraki et al. | |
| 5,862,511 A | 1/1999 | Croyle et al. | |
| 5,874,675 A * | 2/1999 | Edmans | G01P 15/131 73/514.21 |
| 6,029,111 A | 2/2000 | Croyle | |
| 6,076,028 A | 6/2000 | Donnelly et al. | |
| 6,085,151 A | 7/2000 | Farmer et al. | |
| 6,163,690 A | 12/2000 | Lilja | |
| 6,269,290 B1 | 7/2001 | Tsuji et al. | |
| 6,308,134 B1 | 10/2001 | Croyle et al. | |
| 6,337,653 B1 | 1/2002 | Büchler et al. | |
| 6,346,876 B1 | 2/2002 | Flick | |
| 6,356,841 B1 | 3/2002 | Hamrick et al. | |
| 6,363,308 B1 | 3/2002 | Potti et al. | |
| 6,392,527 B1 | 5/2002 | Gilano et al. | |
| 6,401,027 B1 | 6/2002 | Xu et al. | |
| 6,417,802 B1 | 7/2002 | Diesel | |
| 6,431,593 B1 | 8/2002 | Cooper et al. | |
| 6,438,475 B1 | 8/2002 | Gioutsos et al. | |
| 6,532,419 B1 | 3/2003 | Begin | |
| 6,540,255 B1 | 4/2003 | Garcia et al. | |
| 6,611,755 B1 | 8/2003 | Coffee et al. | |
| 6,737,989 B2 | 5/2004 | Flick | |
| 6,756,885 B1 | 6/2004 | Flick | |
| 6,812,888 B2 | 11/2004 | Drury et al. | |
| 6,832,140 B2 | 12/2004 | Fan et al. | |
| 6,912,557 B1 * | 6/2005 | North | G06F 7/483 708/490 |
| 7,015,830 B2 | 3/2006 | Flick | |
| 7,020,501 B1 | 3/2006 | Elliott et al. | |
| 7,050,897 B2 | 5/2006 | Breed et al. | |
| 7,085,637 B2 | 8/2006 | Breed et al. | |
| 7,110,880 B2 | 9/2006 | Breed et al. | |
| 7,158,016 B2 | 1/2007 | Cuddihy et al. | |
| 7,250,850 B2 | 7/2007 | Mizutani | |
| 7,272,493 B1 | 9/2007 | Hamrick et al. | |
| 7,286,929 B2 | 10/2007 | Staton et al. | |
| 7,348,895 B2 | 3/2008 | Lagassey et al. | |
| 7,366,608 B2 | 4/2008 | Hamrick et al. | |
| 7,460,954 B2 | 12/2008 | Hamrick et al. | |
| 7,484,756 B2 | 2/2009 | Chou et al. | |
| 7,527,288 B2 | 5/2009 | Breed et al. | |
| 7,577,525 B2 | 8/2009 | Hamrick et al. | |
| 7,607,510 B1 | 10/2009 | Mun et al. | |
| 7,643,919 B2 | 1/2010 | Nicaise | |
| 7,671,727 B2 | 3/2010 | Flick | |
| 7,725,218 B2 | 5/2010 | Hamrick et al. | |
| 7,765,039 B1 | 7/2010 | Hagenbuch | |
| 7,767,766 B2 | 8/2010 | Tilbrook | |
| 7,805,231 B2 | 9/2010 | Cluff et al. | |
| 7,805,276 B1 | 9/2010 | Byers et al. | |
| 8,004,397 B2 | 8/2011 | Forrest et al. | |
| 8,010,251 B2 | 8/2011 | Hamrick et al. | |
| 8,032,278 B2 | 10/2011 | Flick | |
| 8,155,841 B2 | 4/2012 | Erb | |
| 8,489,271 B2 | 7/2013 | Hergesheimer et al. | |
| 8,688,380 B2 | 4/2014 | Cawse et al. | |
| 8,749,350 B2 | 6/2014 | Geisler et al. | |
| 8,762,009 B2 | 6/2014 | Ehrman et al. | |
| 8,812,173 B2 | 8/2014 | Chen et al. | |
| 8,874,279 B2 | 10/2014 | Frye et al. | |
| 8,996,240 B2 | 3/2015 | Plante | |
| 9,002,538 B2 | 4/2015 | Hergesheimer et al. | |
| 9,171,460 B2 | 10/2015 | Chen | |
| 9,179,497 B1 | 11/2015 | Teixeira et al. | |
| 9,217,757 B2 | 12/2015 | Hergesheimer et al. | |
| 9,406,222 B2 | 8/2016 | Hergesheimer et al. | |
| 9,459,277 B2 | 10/2016 | Hergesheimer et al. | |
| 9,491,420 B2 | 11/2016 | Mimar | |
| 9,644,977 B2 | 5/2017 | Camisa | |
| 2002/0100310 A1 | 8/2002 | Begin | |
| 2003/0001368 A1 | 1/2003 | Breed et al. | |
| 2003/0151507 A1 | 8/2003 | Andre et al. | |
| 2003/0176959 A1 | 9/2003 | Breed et al. | |
| 2004/0036261 A1 | 2/2004 | Breed et al. | |
| 2004/0075539 A1 | 4/2004 | Savoie et al. | |
| 2004/0088090 A1 | 5/2004 | Wee | |
| 2004/0155790 A1 | 8/2004 | Tsuji et al. | |
| 2004/0257208 A1 | 12/2004 | Huang et al. | |
| 2005/0065711 A1 | 3/2005 | Dahlgren et al. | |
| 2005/0099289 A1 | 5/2005 | Arita et al. | |
| 2006/0022469 A1 | 2/2006 | Syed et al. | |
| 2006/0041336 A1 | 2/2006 | Schubert et al. | |
| 2006/0050953 A1 | 3/2006 | Farmer et al. | |
| 2007/0027612 A1 | 2/2007 | Barfoot et al. | |
| 2007/0109117 A1 | 5/2007 | Heitzmann et al. | |
| 2007/0229251 A1 * | 10/2007 | Ehrman | G06Q 10/08 340/539.1 |
| 2007/0257791 A1 | 11/2007 | Arita et al. | |
| 2007/0266078 A1 | 11/2007 | Rittle et al. | |
| 2007/0271014 A1 | 11/2007 | Breed | |
| 2007/0299587 A1 | 12/2007 | Breed et al. | |
| 2008/0111666 A1 | 5/2008 | Plante et al. | |
| 2008/0128600 A1 | 6/2008 | Ogisu et al. | |
| 2008/0150707 A1 | 6/2008 | Shamoto | |
| 2008/0195261 A1 | 8/2008 | Breed | |
| 2008/0202199 A1 | 8/2008 | Finley et al. | |
| 2008/0211666 A1 | 9/2008 | Saidi et al. | |
| 2008/0211914 A1 | 9/2008 | Herrera et al. | |
| 2008/0275601 A1 | 11/2008 | Saito et al. | |
| 2008/0281618 A1 | 11/2008 | Mermet et al. | |
| 2009/0015392 A1 | 1/2009 | Takahashi et al. | |
| 2009/0037056 A1 | 2/2009 | Erb | |
| 2009/0217733 A1 | 9/2009 | Stachow | |
| 2009/0249858 A1 | 10/2009 | Ishikawa et al. | |
| 2010/0039216 A1 | 2/2010 | Knight et al. | |
| 2010/0039247 A1 | 2/2010 | Ziegler et al. | |
| 2010/0039318 A1 | 2/2010 | Kmiecik et al. | |
| 2010/0042286 A1 * | 2/2010 | Lich | B60R 21/0132 701/32.2 |
| 2010/0097316 A1 | 4/2010 | Shaw et al. | |
| 2010/0185524 A1 | 7/2010 | Watkins | |
| 2010/0231002 A1 | 9/2010 | Yoshioka et al. | |
| 2010/0279647 A1 | 11/2010 | Jacobs et al. | |
| 2010/0312473 A1 | 12/2010 | Hoshizaki | |
| 2010/0318257 A1 | 12/2010 | Kalinadhabhotla | |
| 2011/0004444 A1 | 1/2011 | Farrow et al. | |
| 2011/0060496 A1 | 3/2011 | Nielsen et al. | |
| 2011/0106373 A1 | 5/2011 | Hergesheimer et al. | |
| 2011/0109438 A1 | 5/2011 | Dijkstra et al. | |
| 2011/0153367 A1 | 6/2011 | Amigo | |
| 2011/0202225 A1 | 8/2011 | Willis et al. | |
| 2011/0218710 A1 * | 9/2011 | Trinh | B60R 21/0136 701/46 |
| 2011/0264393 A1 | 10/2011 | An | |
| 2011/0320088 A1 | 12/2011 | Eom et al. | |
| 2012/0022780 A1 | 1/2012 | Kulik et al. | |
| 2012/0050095 A1 | 3/2012 | Scherzinger | |
| 2012/0072078 A1 | 3/2012 | Oosaki et al. | |
| 2012/0158211 A1 | 6/2012 | Chen et al. | |
| 2012/0253585 A1 | 10/2012 | Harvie | |
| 2012/0259526 A1 | 10/2012 | Inoue | |
| 2012/0303203 A1 | 11/2012 | Olsen et al. | |
| 2013/0002415 A1 | 1/2013 | Walli | |
| 2013/0024202 A1 | 1/2013 | Harris | |
| 2013/0038439 A1 | 2/2013 | Saito et al. | |
| 2013/0073142 A1 | 3/2013 | Hergesheimer et al. | |
| 2013/0204572 A1 | 8/2013 | Sato | |
| 2013/0275001 A1 | 10/2013 | Hergesheimer et al. | |
| 2013/0297137 A1 | 11/2013 | Fushiki et al. | |
| 2013/0320654 A1 | 12/2013 | Clark et al. | |
| 2014/0069837 A1 | 3/2014 | Naruishi et al. | |
| 2014/0074353 A1 | 3/2014 | Lee et al. | |

(56) References Cited

U.S. PATENT DOCUMENTS

| | | | |
|---|---|---|---|
| 2014/0111354 A1 | 4/2014 | Hergesheimer et al. | |
| 2014/0118132 A1 | 5/2014 | Braunberger et al. | |
| 2014/0142886 A1 | 5/2014 | Hergesheimer et al. | |
| 2014/0143940 A1 | 5/2014 | Iuliano et al. | |
| 2014/0149145 A1 | 5/2014 | Peng | |
| 2014/0180529 A1 | 6/2014 | Simon et al. | |
| 2014/0236518 A1 | 8/2014 | Hergesheimer et al. | |
| 2014/0236519 A1 | 8/2014 | Hergesheimer et al. | |
| 2014/0300739 A1* | 10/2014 | Mimar | H04N 7/188 348/148 |
| 2014/0309843 A1 | 10/2014 | Chen et al. | |
| 2014/0358394 A1 | 12/2014 | Picciotti | |
| 2015/0015385 A1 | 1/2015 | Tomita et al. | |
| 2015/0051796 A1 | 2/2015 | Levy | |
| 2015/0248731 A1 | 9/2015 | Fernandes et al. | |
| 2015/0339241 A1 | 11/2015 | Warner et al. | |
| 2016/0094964 A1 | 3/2016 | Barfield et al. | |
| 2016/0133130 A1 | 5/2016 | Grimm et al. | |
| 2016/0335813 A1 | 11/2016 | Hergesheimer et al. | |
| 2016/0341559 A1 | 11/2016 | Camisa | |
| 2017/0023610 A1 | 1/2017 | Hergesheimer et al. | |
| 2017/0236339 A1 | 8/2017 | Camisa | |

FOREIGN PATENT DOCUMENTS

| | | |
|---|---|---|
| WO | 2002018873 | 3/2002 |
| WO | 2013076695 A1 | 5/2013 |
| WO | 2014049352 A1 | 4/2014 |
| WO | 2014130077 A1 | 8/2014 |
| WO | 2014130078 A1 | 8/2014 |
| WO | 2015121639 A1 | 8/2015 |
| WO | 2015183677 A1 | 12/2015 |
| WO | 2016191306 | 12/2016 |
| WO | 2016200589 | 12/2016 |

OTHER PUBLICATIONS

International Preliminary Report on Patentability for International Application PCT/US2013/054943, Issued Aug. 25, 2015, dated Sep. 3, 2015, 6 Pgs.

International Preliminary Report on Patentability for International Application PCT/US2016/033625, Report issued Dec. 12, 2017, dated Dec. 21, 2017, 6 Pgs.

International Search Report and Written Opinion for International Application No. PCT/US13/54939, Completed Feb. 5, 2014, dated Feb. 24, 2014, 5 pgs.

International Search Report and Written Opinion for International Application No. PCT/US13/54943, Completed Feb. 13, 2014, dated Feb 27, 2014, 6 pgs.

International Search Report and Written Opinion for International Application No. PCT/US2016/033621, completed Jul. 28, 2016, dated Aug. 5, 2016, 11 Pgs.

International Search Report and Written Opinion for International Application No. PCT/US2016/033625, Search completed Jul. 19, 2016, dated Aug. 18, 2016, 7 Pgs.

International Search Report and Written Opinion for International Application No. PCT/US2017/040763, Search completed Aug. 22, 2017, dated Sep. 8, 2017, 15 Pgs.

"Road vehicles—Diagnostic Systems—Part 2: CARB requirements for interchange of digital information", ISO 9141-2, Feb. 1, 1994, 18 pgs.

Surface Vehicle Recommended Practice, E/E Diagnostic Test Modes, Dec. 1991, 32 pgs.

Surface Vehicle Recommended Practice, Universal Interface for OBD II Scan, SAE Standard J2201, Issued Jun. 30, 1993, 45 pgs.

Surface Vehicle Recommended Practice; OBD II Scan Tool, Mar. 1992, 14 pgs.

* cited by examiner

SYSTEMS AND METHODS FOR IMPACT DETECTION WITH NOISE ATTENUATION OF A SENSOR SIGNAL

FIELD OF INVENTION

The present invention relates to impact detection enhancements for a vehicle impact detection system and more particularly to determining an angle of an impact relative to the vehicle.

BACKGROUND

A Global Positioning System (GPS) is a space based global navigation satellite system that utilizes a network of geo-synchronous satellites which can be utilized by a GPS receiver to determine its location. Many telematics systems incorporate a Global Positioning System (GPS) receiver, which can be used to obtain the location of a vehicle at a certain measured time. By comparing the location of a vehicle at a plurality of measured times, the speed of the vehicle can be determined. GPS receivers can also determine speed by measuring the Doppler shift in the received satellite signals. The acceleration of the vehicle can be determined as the change in speed divided by the time between the measurements. A GPS receiver's ability to determine acceleration can be limited due to the dependence of the measurement upon factors such as reception and satellite availability. In addition to location information, a GPS receiver can also be configured to provide time data.

An accelerometer is a device that measures acceleration associated with the weight experienced by a test mass in the frame of reference of the accelerometer device. The acceleration measured by an accelerometer is typically a weight per unit of test mass, or g-force.

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

SUMMARY OF THE INVENTION

Systems and methods for impact detection in accordance with embodiments of the invention are disclosed. In one embodiment, a vehicle impact detection system includes an acceleration sensor, a storage device storing an impact detection application, and a processor, where the impact detection application directs the processor to receive acceleration information using the acceleration sensor, filter the acceleration information to attenuate noise, determine an occurrence of an impact by detecting an acceleration from the acceleration information that exceeds a threshold for a time period, detect an angle of the impact with respect to a forward direction using the acceleration information, and trigger an impact detector signal.

In another embodiment of the invention, the threshold value is pre-determined.

In an additional embodiment of the invention, filtering the acceleration information includes using a series of accumulators positioned in a circular queue.

In yet another additional embodiment of the invention, each accumulator holds up to 32 samples.

In still another additional embodiment of the invention, detecting the angle of the impact includes computing a first vector perpendicular to the forward direction, and computing an angle between the first vector and a vector corresponding to a direction of the acceleration.

In yet still another additional embodiment of the invention, the acceleration sensor is a micro-electro-mechanical system (MEMS).

In yet another embodiment of the invention, filtering the acceleration information includes using a configurable moving average filter to attenuate acoustic noise.

In still another embodiment of the invention, the acceleration information is a signal that includes a leading edge, a trailing edge, and an amplitude.

In yet still another embodiment of the invention, the impact detection application further directs the processor to generate impact data based on the detected angle of the impact and the impact detector signal.

Still another embodiment of the invention includes a method for determining an angle of impact of a vehicle, that includes receiving acceleration information using a vehicle impact detection system, filtering the acceleration information to attenuate noise using the vehicle impact detection system, determining an occurrence of an impact by detecting an acceleration from the acceleration information that exceeds a threshold for a time period using the vehicle impact detection system, detecting the angle of the impact with respect to a forward direction using the acceleration information, and triggering an impact detector signal using the vehicle impact detection system.

In another embodiment of the invention, the threshold value is pre-determined.

In an additional embodiment of the invention, filtering the acceleration information includes using a series of accumulators positioned in a circular queue.

In still another additional embodiment of the invention, each accumulator holds up to 32 samples.

In yet still another additional embodiment of the invention, detecting the angle of the impact includes computing a first vector perpendicular to the forward direction using the vehicle impact detection system and computing an angle between the first vector and a vector corresponding to a direction of the acceleration using the vehicle impact detection system.

In yet another embodiment of the invention, using the vehicle impact detection system includes an acceleration sensor, a processor, and a memory.

In still another embodiment of the invention, filtering the acceleration information includes using a configurable moving average filter to attenuate acoustic noise using the vehicle impact detection system.

In yet still another embodiment of the invention, acceleration information is a signal comprising a leading edge, a trailing edge, and an amplitude.

In a further embodiment of the invention still, the method further includes generating impact data based on the detected angle of the impact and the impact detector signal using the vehicle impact detection system.

In a still further embodiment of the invention still, the method further includes transmitting the impact data to a remote server system using the vehicle impact detection system.

DETAILED DESCRIPTION

Turning now to the drawings, systems and methods for impact detection in accordance with embodiments of the invention are illustrated. In particular, acceleration data gathered from one or more sensor(s) can be used to detect an occurrence of an impact to a vehicle, which can provide insights into driver behavior. For example, such data can indicate a variety of driver behaviors, including, but not limited to, occurrence of accidents and collisions with obstacles. Furthermore, impact detection systems can be positioned within mobile containers, such as cargo, to detect the occurrence of impacts to the containers and thus identify the source of damaged goods during transport. Although the discussion below primarily discusses impact detection systems used within a vehicle (such as an automobile, commercial vehicle, tractor, forklift, among various other types of vehicles), impact detection systems can be utilized within any of a variety of different types of devices (e.g., cargo containers, goods, among various other types of items) that require the detection of impacts as appropriate to the requirements of specific application.

An impact detection system can use include one or more sensors capable of gathering information that can be used to identify the occurrence of an impact as appropriate to the requirements of specific applications of embodiments of the invention. For example, the sensors can include an accelerometer that is able to detect an acceleration of the vehicle in a particular direction. Accelerometers are often installed on a vehicle or mobile device. Accurate accelerometer data aligned with the axes of the vehicle is beneficial in many applications, including, but not limited to, telematics. Telematics is the integrated use of telecommunications and informatics, including, but not limited to, monitoring vehicle movement and behavior. Systems and methods for aligning a 3-axis accelerometer to a vehicle in accordance with embodiments of the invention are disclosed in U.S. Patent Publication No. 2013/0073142, titled "Systems and Methods for 3-Axis Accelerometer Calibration" and filed Sep. 19, 2012, the entirety of which is hereby incorporated by reference. Systems and methods for efficient characterization of acceleration events are disclosed in U.S. Patent Publication No. 2014/0142886, titled "Systems and Methods for Efficient Characterization of Acceleration Events" and filed Nov. 21, 2012, the entirety of which is hereby incorporated by reference.

In many embodiments, a vehicle impact detection system can be able to detect the occurrence of an impact to the vehicle, including the force and direction of the impact relative to a moving direction of the vehicle. In particular, the vehicle impact detection system can trigger a signal when it detects an acceleration (e.g., caused by an impact) that exceeds a predefined threshold for a time period. In some embodiments, the acceleration can be measured using a micro-electro-mechanical system (MEMS) that can consist of a central unit that processes data (i.e., the microprocessor) and several components that interact with the surroundings, including interacting with various sensors of the vehicle impact detection device. Certain MEMS systems can be prone to acoustic noise generated by the operation of the vehicle and can lead to inconsistency in impact detection and in particular, the ability to identify accelerations that are the result of an impact versus those accelerations resulting from vibrations and/or the operation of the vehicle. The noise includes, but is not limited to, noise from the device itself and vibrations from the vehicle in which the device is mounted. For example, many heavy machinery vehicles such as forklifts can have large engines and motors that produce a lot of vibration and noise. Thus, differentiating between an impact to the vehicle and a vibration can require an analysis of the input signal that is able to attenuate the noise within the signal that is a result of the vibrations.

Accordingly, many embodiments of the vehicle impact detection system can include a filter that attenuates acoustic noise from an input signal and thus provides better consistency of the threshold detection. In some embodiments, the filter is a configurable moving average filter implemented as four accumulators in a circular queue. In certain embodiments, the required memory for implementing the filter can be reduced to 128 samples by using four accumulators. In several embodiments, each accumulator holds up to 32 samples. In many embodiments, the acceleration information is a signal including a leading edge, a trailing edge, and an amplitude that are utilized to characterize the acceleration information.

Furthermore, many embodiments of the vehicle impact detection system can determine an angle of an impact relative to a moving direction of the vehicle. In certain embodiments, in order to increase an accuracy for determining a particular direction of an impact, these embodiments compute an angle between a detected acceleration vector and a vector that is perpendicular to a forward direction of the vehicle. Examples of vehicle impact detection systems that include filters to attenuate noise in accordance with embodiments of the invention are described below.

Vehicle Impact Detection Systems

Figure 1:
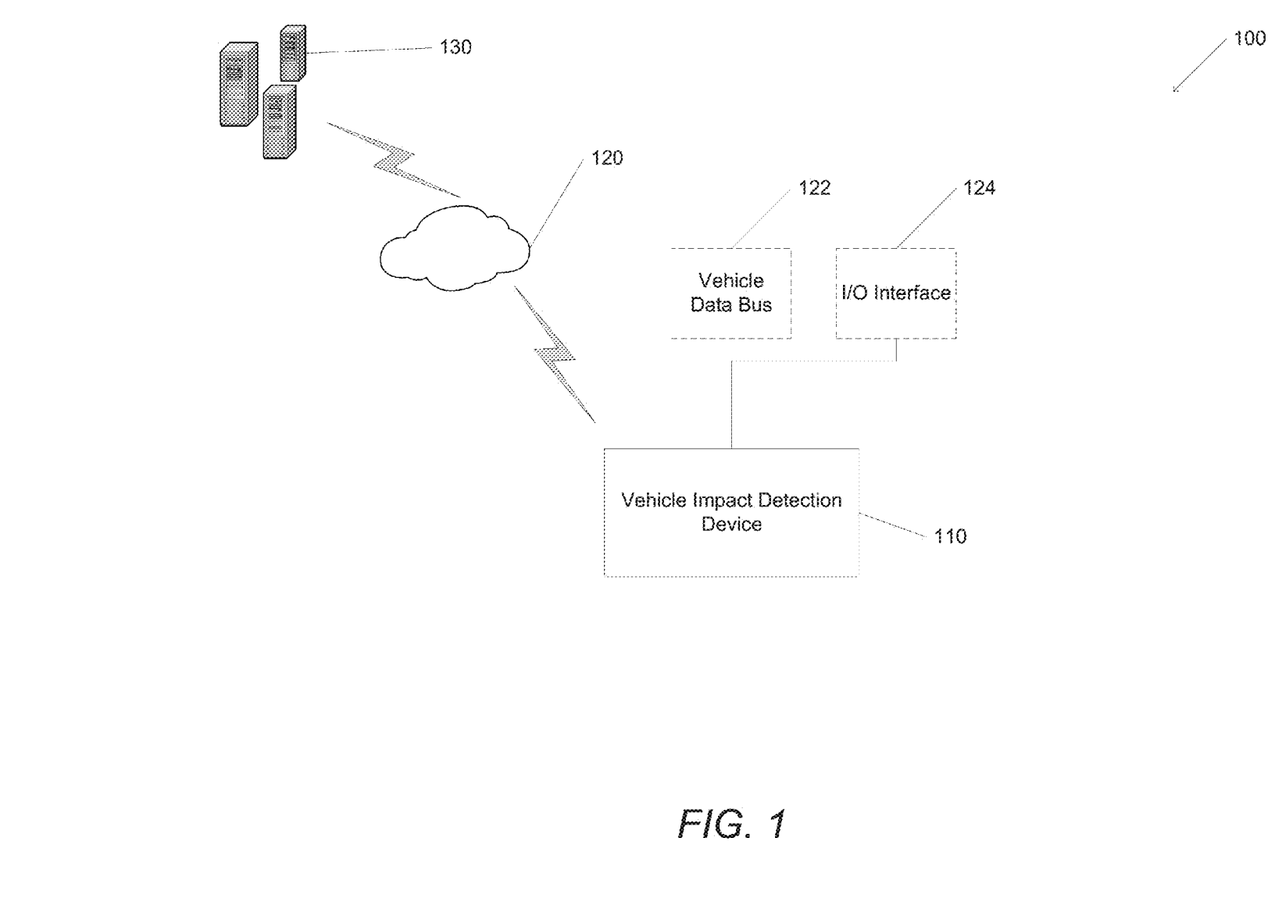
FIG. 1 conceptually illustrates a vehicle impact detection system in accordance with an embodiment of the invention.

Vehicle impact detection systems can obtain a variety data that can be used to determine the occurrence of an impact to the vehicle. A conceptual diagram of a vehicle impact detection system in accordance with an embodiment of the invention is shown in FIG. 1. The vehicle impact detection system 100 includes a vehicle impact detection device 110 that can be capable of communicating with a remote server system 130, a vehicle data bus 122, and/or an input/output (I/O) interface 124 as appropriate to the requirements of specific applications of embodiments of the invention. In a variety of embodiments, the vehicle impact detection device 110 communicates with the remote server system 130 via a network 120. In a variety of embodiments, the network 120 is the Internet. In many embodiments, the network 120 is any wired or wireless connection, such as a cellular network connection, between the vehicle impact detection device 110 and the remote server system 130. In a number of embodiments, the remote server system 130 implemented using a single server system. In several embodiments, the remote server system 130 is implemented using multiple server systems.

In a variety of embodiments, the vehicle impact detection device 110 is installed in a vehicle having a vehicle data bus 122. The vehicle impact detection device 110 can obtain data from any of a variety of vehicle devices connected to the vehicle data bus 122 utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Positioning System (GPS) receivers, ignition devices, accelerometers, and/or other sensors capable of providing acceleration information. Systems and methods for connecting to a vehicle data bus that can be utilized in accordance with embodiments of the invention are described in SAE J1978, titled "OBD II Scan Tool", first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes", first published by SAE International on Dec. 1, 1991 and last updated Aug. 11, 2014. The disclosures of SAE J1978 and SAE J1979 are hereby incorporated by reference in their entirety.

The vehicle impact detection device 110 can include any of a variety of sensors and/or devices, including those described above with respect to the vehicle data bus and those described in more detail below, to obtain data regarding the occurrence of an impact to the vehicle and/or an angle of the impact with respect to a direction of the vehicle. This data can also be utilized in a variety of vehicle impact detection processes to determine the status of the vehicle and the occurrence of impact(s) to the vehicle as described in more detail below. The vehicle impact detection device 110 can also communicate with any of a variety of sensors and/or devices using the I/O interface 124 as appropriate to the requirements of specific applications of embodiments of the invention. The I/O interface 124 can be any connection, including wired and wireless connections, as appropriate to the requirements of specific applications of embodiments of the invention.

In many embodiments, the vehicle impact detection device utilizes an accelerometer in order to determine the location, speed, and/or acceleration of the vehicle. In certain embodiments, the vehicle impact detection device utilized a Global Positioning System (GPS) receiver and/or accelerometer to determine the location, speed, and/or acceleration of the vehicle. However, it should be noted that any location-determining techniques, such as cellular tower triangulation, wireless network geolocation techniques, and dead reckoning techniques, can be utilized as appropriate to the requirements of specific applications of embodiments of the invention.

In a variety of embodiments, the vehicle impact detection device 110 and/or remote server system 130 provides a user interface allowing for visualizing and interacting with the data. In several embodiments, the vehicle impact detection device 110 and/or remote server system 130 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture of a vehicle impact detection system in accordance with embodiments of the invention are discussed above and illustrated in FIG. 1, a variety of architectures, including sensors and other devices and techniques not specifically named, can be utilized in accordance with embodiments of the invention. Furthermore, the processes described herein can be performed using any combination the vehicle impact detection device and/or the remote server systems as appropriate to the requirements of specific applications of embodiments of the invention.

Vehicle Impact Detection Devices

Figure 2:
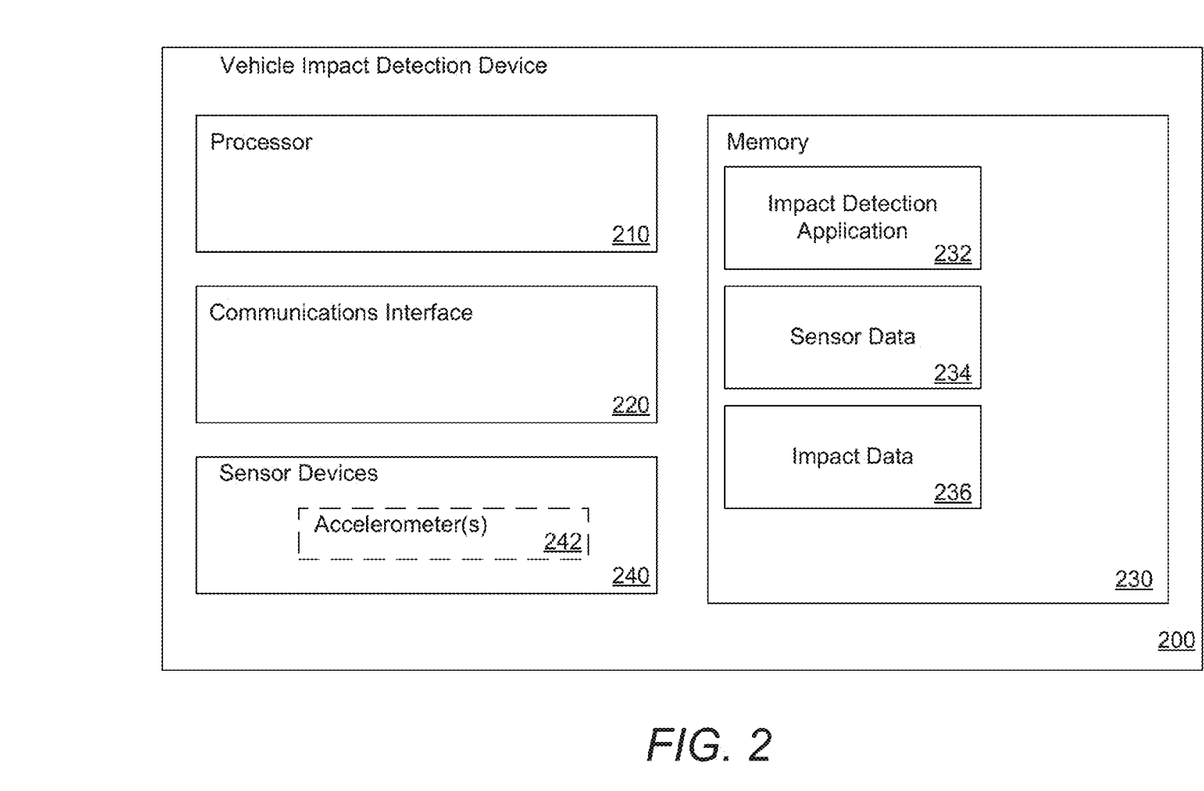
FIG. 2 conceptually illustrates a vehicle impact detection device in accordance with an embodiment of the invention.

Vehicle impact detection devices in accordance with embodiments of the invention can obtain data regarding the status of a vehicle, including occurrences of impacts to the vehicle. A conceptual illustration of a vehicle impact detection device in accordance with an embodiment of the invention is shown in FIG. 2. The vehicle impact detection device 200 includes a processor 210 in communication with memory 230. The vehicle impact detection device 200 also includes one or more communication interfaces 220 capable of sending and receiving data. In a number of embodiments, the communication interface 220 is in communication with the processor 210, the memory 230, and/or the sensor device(s) 240, which can include one or more accelerometer(s) 242 as appropriate to the requirements of specific applications of embodiments of the invention. In several embodiments, the memory 230 is any form of storage configured to store a variety of data, including, but not limited to, an impact detection application 232, sensor data 234, and/or impact data 236. In many embodiments, impact detection application 232, sensor data 234, and/or impact data 236 is stored using an external server system and received by the vehicle impact detection device 200 using the communications interface 220.

The processor 210 is configured by the impact detection application 232 to perform a variety of vehicle impact detection processes. Vehicle impact detection processes can include obtaining sensor data 234 from a variety of sensor devices and/or accelerometer(s) 242 to determine an occurrence of an impact to the vehicle and/or an angle of the impact. Impact data 236 describing the occurrence of an impact can be generated. Sensor devices 240 can include RPM sensors, voltage sensors, GPS receivers, noise sensors, vibration sensors, acceleration sensors 242, and any other device capable of measuring data regarding a vehicle, including an occurrence of impacts to the vehicle, as appropriate to the requirements of specific applications of embodiments of the invention. Sensor devices 240 can be included within the vehicle impact detection device 200 and/or located external to the vehicle impact detection device 200. The vehicle impact detection device 200 can communicate with external sensor devices using the communications interface 220, such as via a vehicle data bus, I/O interface, and/or a network connection as appropriate to the requirements of specific applications of embodiments of the invention. In many embodiments, the sensor data 234 and/or impact data 236 is transmitted to a remote server system using the communications interface 220. A number of vehicle impact detection processes that can be performed in order to detect an occurrence of an impact in accordance with embodiments of the invention are described in more detail below.

Although a specific architecture for a vehicle impact detection device in accordance with an embodiment of the invention is conceptually illustrated in FIG. 2, any of a variety of architectures, including those that store data or applications on disk or some other form of storage and are loaded into memory at runtime, can also be utilized. In a variety of embodiments, the memory 230 includes circuitry such as, but not limited to, memory cells constructed using transistors, that are configured to store instructions. Similarly, the processor 210 can include logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Impact Detection

Figure 3:
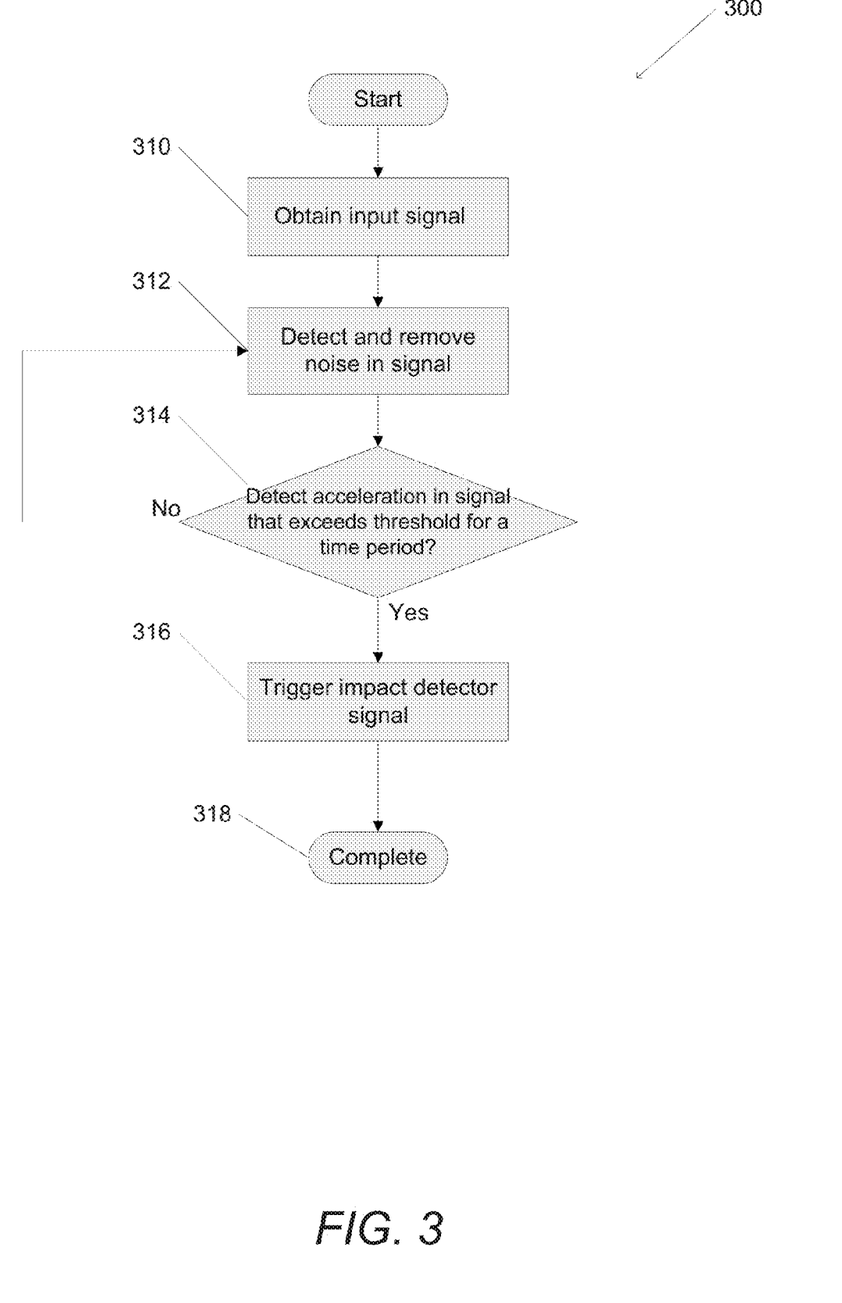
FIG. 3 is a flow chart illustrating a process for filtering noise from an input signal of a sensor device in order to detect the occurrence of an impact in accordance with an embodiment of the invention.

In many embodiments, a vehicle impact detection device can include an impact detector that is able to attenuate acoustic noise from an input signal and thus provides better consistency of the impact detection based on acceleration information. In some embodiments, the vehicle impact detection device includes a configurable moving average filter implemented as four accumulators in a circular queue which can be used to filter out the noise. In certain embodiments, the required memory for implementing the filter can be reduced to 128 samples by using four accumulators with each accumulator holding up to 32 samples. An example of a process for filtering noise from an input signal of a sensor device in order to detect the occurrence of an impact in accordance with an embodiment of the invention is illustrated in FIG. 3.

The process 300 obtains (at 310) an input signal. The input signal can be a signal received from one or more sensor devices of the vehicle impact detection device. In some embodiments, the signal is provided by one or more impact detectors positioned throughout the vehicle. In some embodiments, the impact detector can be any one of or combination of an accelerometer, gyroscope, GPD device, or any other device that can be used to detect an acceleration of the vehicle in a particular direction.

The process detects and removes (at 312) noise from the input signal. In some embodiments, the process uses a filter to detect and remove the noise from the filter. In some embodiments, the filter computes a moving average of the signal and removes this from the signal. An example of a process for removing noise using a moving average filter is described in detail below with respect to FIG. 4. Other embodiments can compute different values to detect the noise in the signal, including the mode, median, or any other value as appropriate to the requirements of specific applications in accordance with embodiments of the invention.

The process determines (at 314) whether it detects an acceleration in the signal that exceeds a threshold for a time period. The threshold can be determined based on the type of vehicle, the location of the acceleration on the vehicle, among various other factors.

If the process detects the acceleration in the signal that exceeds the threshold for the time period, the process triggers (316) the impact detector signal. Otherwise, the process returns to 310 to obtain newer input signals. In some embodiments, the impact detector signal can be used to initiate various safety devices of the vehicle, including, for example, airbags, seatbelts, brakes, steering, among various others. The process then completes.

Figure 4:
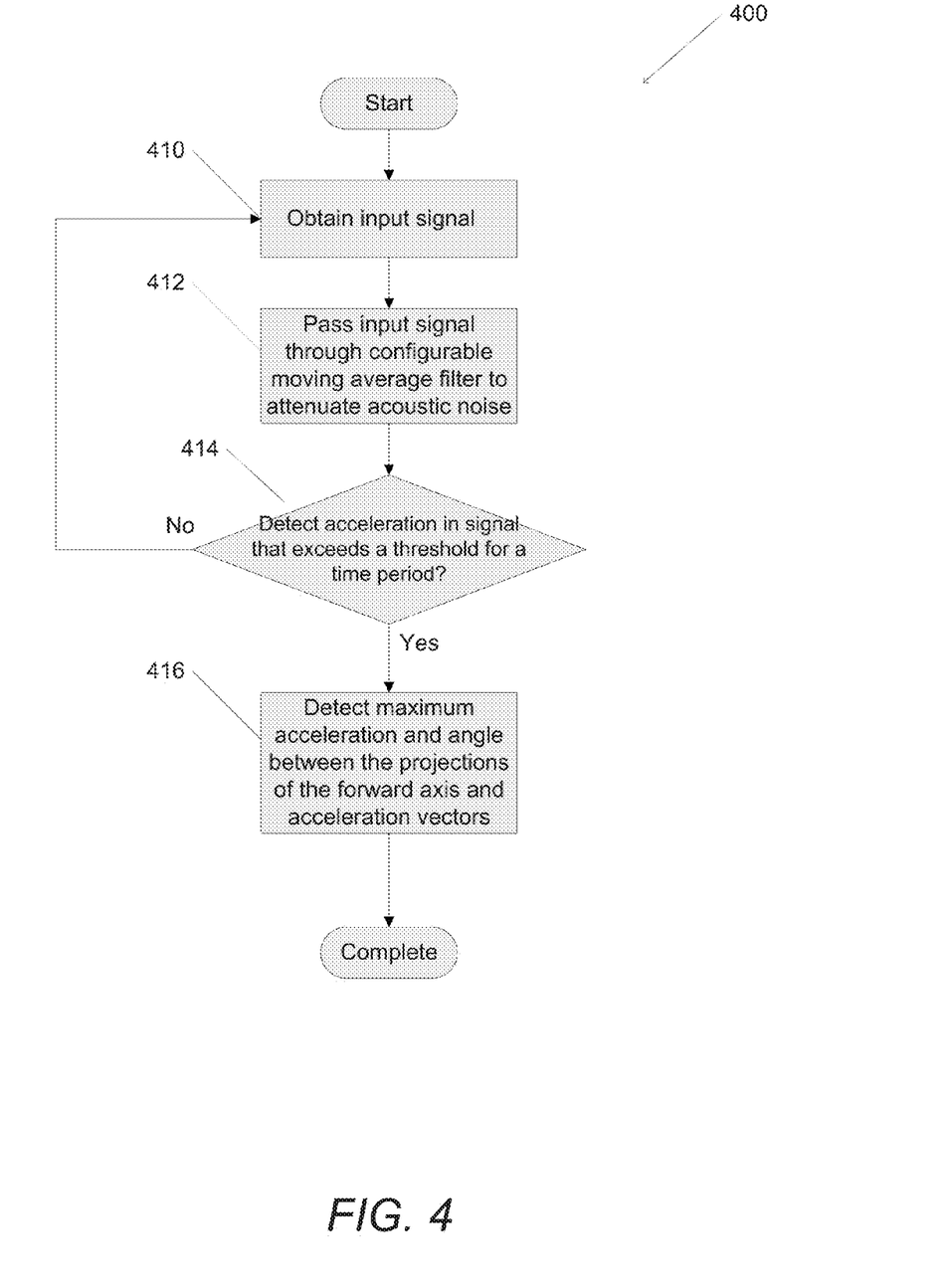
FIG. 4 is a flow chart illustrating a process for removing noise from a signal using a configurable moving average filter and determining an angle of the impact in accordance with an embodiment of the invention.

As described above, different filters can be used to attenuate the noise from an input signal. Many embodiments can implement a circular queue of accumulators that are used to compute a moving average of the input signal to determine and remove the noise from the signal. Furthermore, many embodiments can use one or more accumulators that are able to record both the acceleration and angle of the impact. An example of a process for removing noise from a signal using a configurable moving average filter and determining an angle of the impact in accordance with an embodiment of the invention is illustrated in FIG. 4.

The process obtains (at 410) an input signal passes (at 412) the input signal through a configurable moving average filter to attenuate the acoustic noise. In some embodiments, the configurable moving average filter can be implemented as a series of four accumulators in a circular queue, each sampling 32 samples of the input signal for a total of 128 samples.

The process determines (at 414) whether it detects an acceleration in the signal that exceeds a threshold for a time period. If the process does not detect an acceleration that exceeds a threshold for a time period, the process returns to 410 to obtain an input signal.

Figure 5:
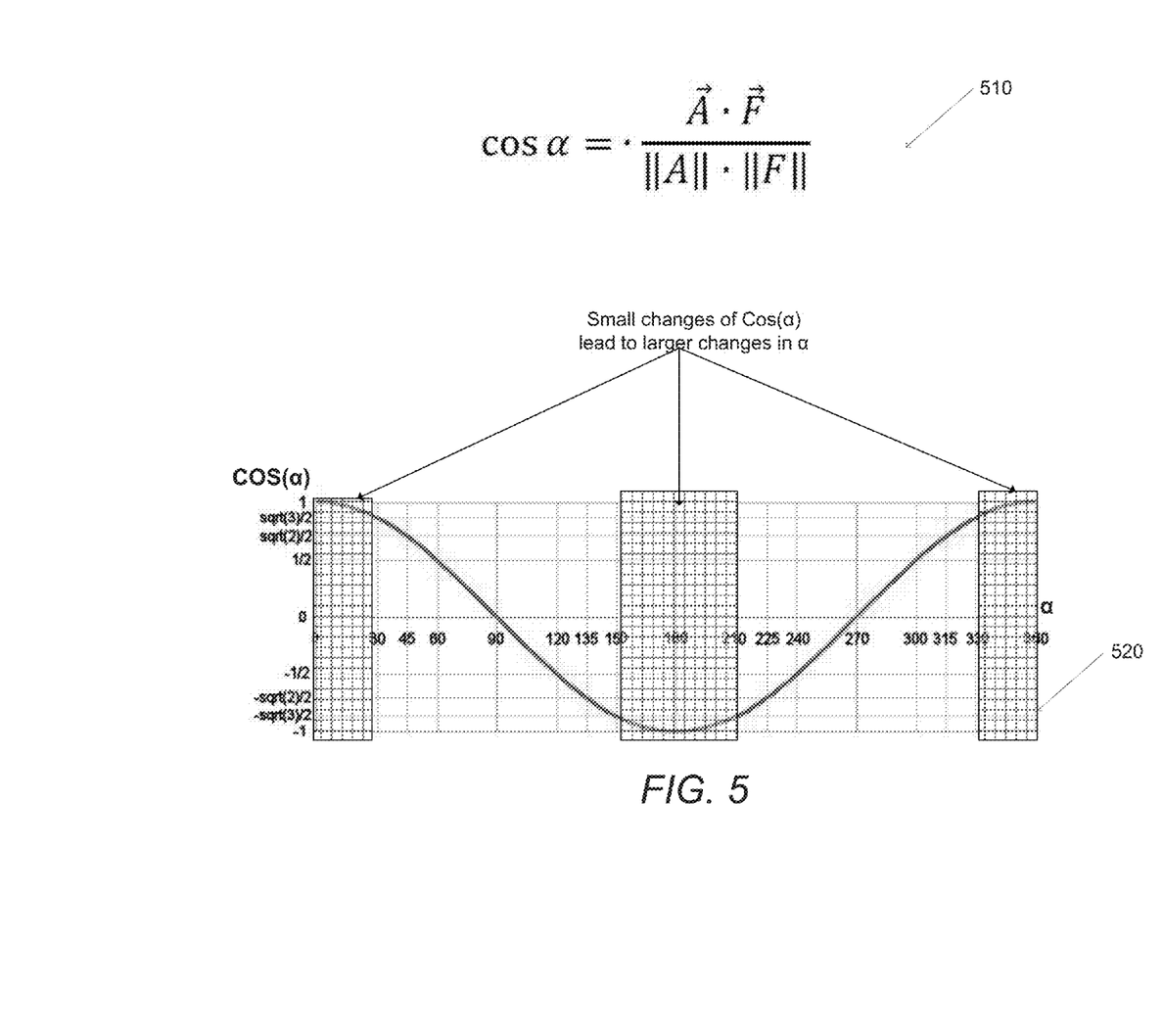
FIG. 5 illustrates an equation for computing an angle between two vectors in accordance with an embodiment of the invention.

If the process does detect an acceleration that exceeds the threshold for the time period, the process determines the maximum acceleration and angle between the projections of the forward axis and acceleration vectors. FIG. 5 illustrates an equation 510 for computing an angle between two vectors. The process then completes.

As described above, the vehicle impact detection device can detect an impact as well as the direction of the impact relative to a moving direction of the vehicle. In some embodiments, the direction of the impact can be computed using equation 510 illustrated in FIG. 5.

In particular, equation (1) below provides that:

$$\cos \alpha = \cdot \frac{\vec{A} \cdot \vec{F}}{\|A\| \cdot \|F\|} \quad (1)$$

where $\alpha$ is the angle between the acceleration vector $\vec{A}$ and the vector of the forward axis $\vec{F}$ in the horizontal plane.

Graph 520 illustrates the $\alpha$ (x-axis) angle value relative to the cos $\alpha$ value (y-axis). As illustrated by graph 520, for certain portions of the graph, illustrated by the checkered squares overlaid on the graph, small changes in the cos $\alpha$ value can lead to larger changes in the $\alpha$ values, in particular around values near 0 degrees and 180 degrees. Thus certain impacts to the vehicle that can be head-on (near 0 degrees) or rear-end (near 180 degrees) type impacts can result in less precision regarding being able to ascertain the exact angle of impact given the smaller changes in the cos $\alpha$ value that is computed for the vectors will result in larger changes in the computed $\alpha$ values.

Figure 6:
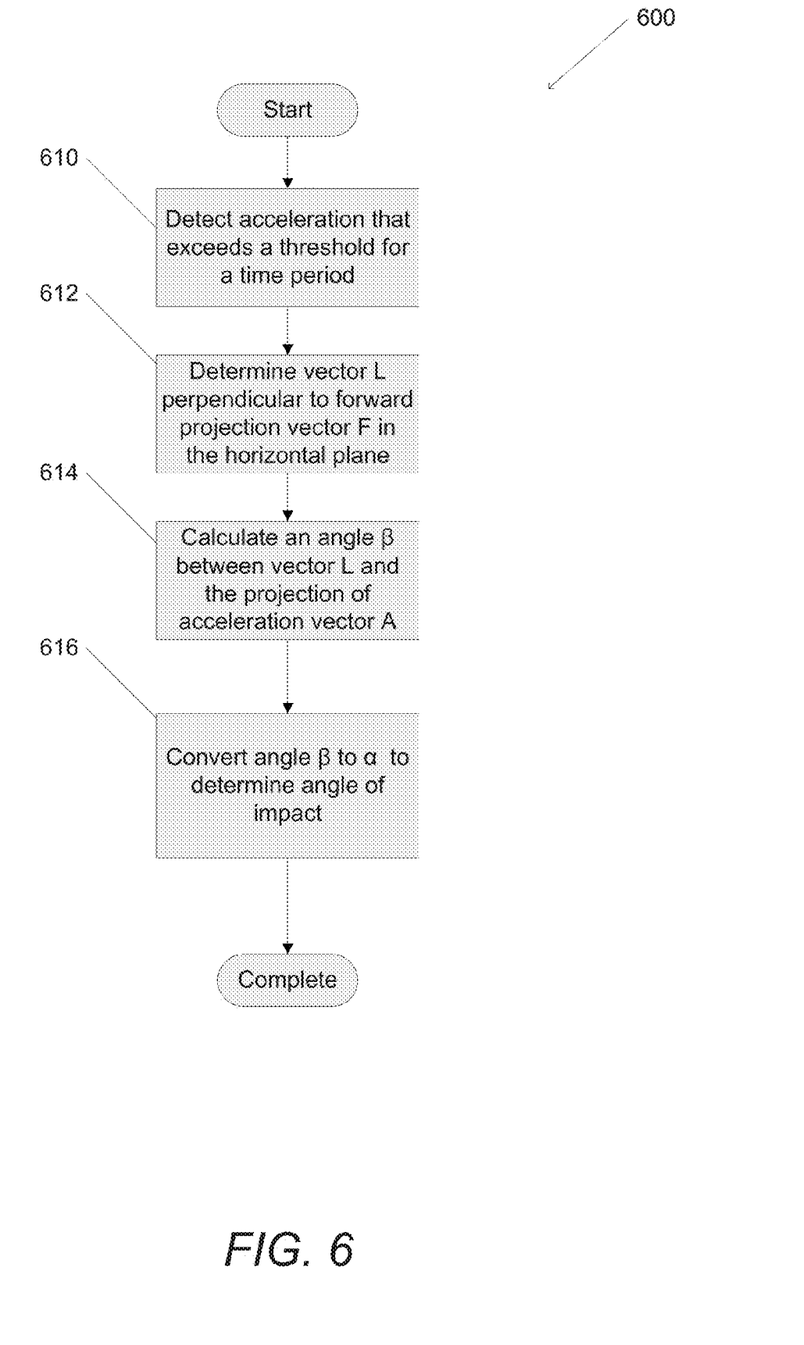
FIG. 6 is a flow chart illustrating a process for computing an angle of impact in accordance with an embodiment of the invention.
Figure 7:
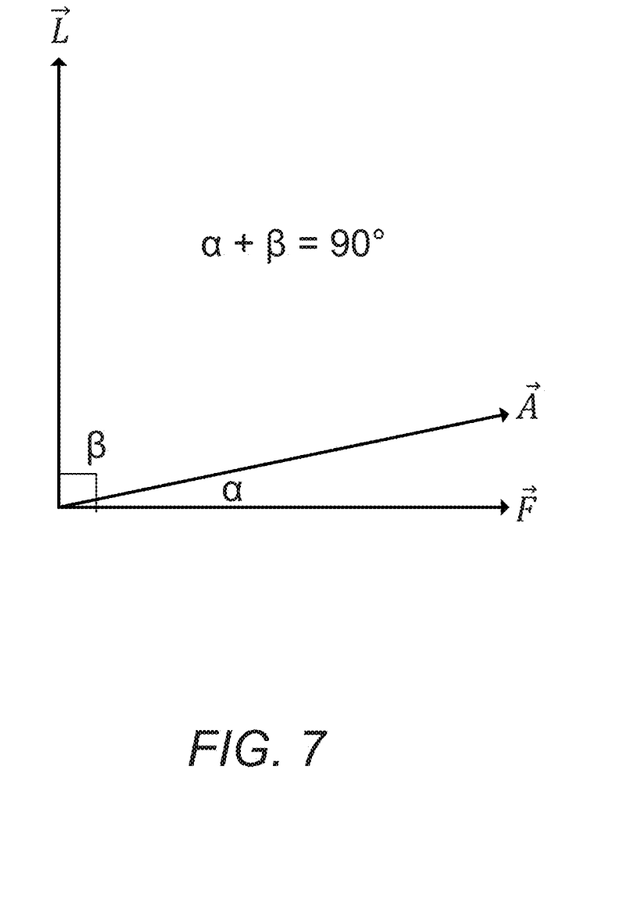
FIG. 7 conceptually illustrates a vector perpendicular to the forward projection in the horizontal plane and the projection of the acceleration in accordance with an embodiment of the invention.

In order to improve precision for calculating angles close to 0 degrees and 180 degrees, some embodiments recalculate the $\alpha$ angle using a vector perpendicular to the forward projection in the horizontal plane and the projection of the acceleration. An example of a process for computing an angle of impact in accordance with an embodiment of the invention is illustrated in FIG. 6. Furthermore, FIG. 7 illustrates the relationship between the various vectors, including a vector $\vec{L}$ that is perpendicular (or at a 90 degree angle) with respect to the forward projection vector $\vec{F}$ in the horizontal plane.

The process 600 detects (at 610) an acceleration that exceeds a threshold for a time period. The process determines (at 612) a vector $\vec{L}$ that is perpendicular to the forward projection vector $\vec{F}$ in the horizontal plane. The process calculates (at 614) an angle β between vector $\vec{L}$ and the projection of acceleration vector $\vec{A}$ using equation (1) above. The process can convert (at 616) angle β to angle α using equation (2), below:

$$\alpha + \beta = 90° \tag{2}$$

Although specific processes are described above with respect to FIG. 6 with respect to determine an angle of an impact using a vector perpendicular to the forward projection of the vehicle, any of a variety of processes can be utilized to determine an angle of impact as appropriate to the requirements of specific applications in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A vehicle impact detection system, comprising:
an acceleration sensor comprising a 3-axis accelerometer;
a storage device storing an impact detection application; and
a processor coupled to the acceleration sensor and the storage device;
wherein, when executed, the impact detection application directs the processor to:
receive 3-axis acceleration information by using the acceleration sensor, wherein the 3-axis acceleration information comprises at least one vector describing acceleration of the vehicle in 3 dimensions;
filter the 3-axis acceleration information to attenuate noise by using a configurable moving average filter;
determine an occurrence of an impact by detecting an acceleration from the filtered 3-axis acceleration information that exceeds a threshold for a time period;
detect an angle of the impact with respect to a forward direction by using the filtered 3-axis acceleration information; and
trigger an impact detector signal based on the determined occurrence of an impact and the angle of the impact.

2. The vehicle impact detection system of claim 1, wherein the threshold value is pre-determined.

3. The vehicle impact detection system of claim 1, wherein filtering the acceleration information comprises using a series of accumulators positioned in a circular queue.

4. The vehicle impact detection system of claim 3, wherein each of the accumulators holds up to 32 samples.

5. The vehicle impact detection system of claim 1, wherein detecting the angle of the impact comprises:
computing a first vector perpendicular to the forward direction; and
computing an angle between the first vector and a vector corresponding to a direction of the acceleration.

6. The vehicle impact detection system of claim 1, wherein the acceleration sensor is a micro-electro-mechanical system (MEMS).

7. The vehicle impact detection system of claim 1, wherein the acceleration information is a signal comprising a leading edge, a trailing edge, and an amplitude.

8. The vehicle impact detection system of claim 1, wherein the impact detection application further directs the processor to generate impact data based on the angle of the impact and the impact detector signal.

9. The vehicle impact detection system of claim 8, wherein:
the vehicle impact detection system further comprises a network interface; and
the impact detection application further directs the processor to transmit the impact data to a remote server system by using the network interface.

10. A method for determining an angle of impact of a vehicle, comprising:
receiving 3-axis acceleration information by using a vehicle impact detection system, wherein the 3-axis acceleration information comprises at least one vector describing acceleration of the vehicle in 3 dimensions obtained from a 3-axis accelerometer;
filtering the 3-axis acceleration information to attenuate noise by using a configurable moving average filter of the vehicle impact detection system;
determining an occurrence of an impact by detecting an acceleration from the 3-axis acceleration information that exceeds a threshold for a time period by using the vehicle impact detection system;
detecting the angle of the impact with respect to a forward direction by using the 3-axis acceleration information; and
triggering an impact detector signal by using the vehicle impact detection system.

11. The method of claim 10, wherein the threshold value is pre-determined.

12. The method of claim 10, wherein filtering the acceleration information comprises using a series of accumulators positioned in a circular queue.

13. The method of claim 12, wherein each of the accumulators holds up to 32 samples.

14. The method of claim 10, wherein detecting the angle of the impact comprises:
computing a first vector perpendicular to the forward direction by using the vehicle impact detection system; and
computing an angle between the first vector and a vector corresponding to a direction of the acceleration by using the vehicle impact detection system.

15. The method of claim 10, wherein the using the vehicle impact detection system comprises an acceleration sensor, a processor, and a memory.

16. The method of claim 10, wherein the acceleration information is a signal comprising a leading edge, a trailing edge, and an amplitude.

17. The method of claim 10, further comprising generating impact data based on the angle of the impact and the impact detector signal by using the vehicle impact detection system.

18. The method of claim 17, further comprising transmitting the impact data to a remote server system by using the vehicle impact detection system.

* * * * *